(12) United States Patent
Webb et al.

(10) Patent No.: US 10,178,677 B2
(45) Date of Patent: Jan. 8, 2019

(54) TRANSMISSION OF CONTROL INFORMATION TO REDUCED BANDWIDTH TERMINALS

(71) Applicant: SONY CORPORATION, Tokyo (JP)

(72) Inventors: Matthew Webb, London (GB); Hideji Wakabayashi, Reading (GB); Yuichi Morioka, Reading (GB)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 14/442,179

(22) PCT Filed: Dec. 2, 2013

(86) PCT No.: PCT/GB2013/053189
§ 371 (c)(1),
(2) Date: May 12, 2015

(87) PCT Pub. No.: WO2014/087146
PCT Pub. Date: Jun. 12, 2014

(65) Prior Publication Data
US 2016/0295568 A1    Oct. 6, 2016

(30) Foreign Application Priority Data

Dec. 3, 2012  (GB) .................................. 1221717.0
Dec. 3, 2012  (GB) .................................. 1221729.5
(Continued)

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0037* (2013.01); *H04L 5/0064* (2013.01);
(Continued)

(58) Field of Classification Search
CPC ... H04L 5/0053; H04L 5/0007; H04L 5/0094; H04L 5/0048; H04L 5/001; H04L 5/0023;
(Continued)

(56) References Cited

U.S. PATENT DOCUMENTS 8,520,619 B2 *  8/2013  Hong .................... H04L 5/0053
                                                    370/329
8,520,621 B2 *  8/2013  Tee ......................... H04L 5/001
                                                    370/329
(Continued)

FOREIGN PATENT DOCUMENTS

CN  101364943 B   4/2012
CN    1977518 B  11/2012
(Continued)

OTHER PUBLICATIONS

U.S. Appl. No. 14/431,108, filed Mar. 25, 2015, Webb, et al.
(Continued)

Primary Examiner — Wutchung Chu
(74) Attorney, Agent, or Firm — XSENSUS LLP

(57) ABSTRACT

A method receiving data at a communications terminal from an OFDM wireless communications network including a wireless access interface communicating the data using plural OFDM sub-carriers includes: receiving from a first control channel having a bandwidth corresponding to a first frequency band providing first plural OFDM sub-carriers a resource allocation message allocating communications resources of a second group of OFDM sub-carriers; and receiving from a second control channel within the second frequency band within the second group of OFDM sub-carriers control information specific to the communications terminal operating to receive the data via the second group of OFDM sub-carriers. The communications terminal receives resource allocation messages from the first control channel to allocate resources within the second frequency
(Continued)

band forming a virtual carrier and to receive control information specific to the communications terminal, which receives data from the second frequency band of the virtual carrier via a second control channel.

15 Claims, 10 Drawing Sheets

(30) Foreign Application Priority Data

Jun. 11, 2013 (EP) .................................. 13171558
Jun. 11, 2013 (EP) .................................. 13171561

(51) Int. Cl.
*H04L 27/26* (2006.01)
*H04W 52/02* (2009.01)

(52) U.S. Cl.
CPC ........ *H04L 5/0094* (2013.01); *H04L 27/2601* (2013.01); *H04W 52/0212* (2013.01); *H04W 72/042* (2013.01); *H04W 72/0446* (2013.01); *H04W 72/0453* (2013.01); *H04L 5/0007* (2013.01); *H04L 5/0048* (2013.01); *Y02D 70/1242* (2018.01); *Y02D 70/1262* (2018.01); *Y02D 70/21* (2018.01)

(58) Field of Classification Search
CPC ............ H04L 27/2602; H04W 72/042; H04W 72/0446; H04W 72/0453; H04W 72/0406; H04W 72/048; H04W 52/0206
See application file for complete search history.

(56) References Cited

U.S. PATENT DOCUMENTS

| | | | | |
|---|---|---|---|---|
| 8,660,082 | B2* | 2/2014 | Parkvall | H04L 5/0053 370/330 |
| 9,220,096 | B2* | 12/2015 | Chun | H04L 5/00 |
| 9,344,231 | B2* | 5/2016 | Kang | H04L 5/0053 |
| 9,407,408 | B2* | 8/2016 | Chun | H04L 5/0048 |
| 9,479,378 | B2* | 10/2016 | Bai | H04L 27/2628 |
| 9,497,012 | B2* | 11/2016 | Seo | H04L 1/1861 |
| 9,503,238 | B2* | 11/2016 | Ji | H04L 5/0051 |
| 9,531,516 | B2* | 12/2016 | Kim | H04L 5/005 |
| 9,826,546 | B2* | 11/2017 | Li | H04L 1/0026 |
| 2009/0010213 | A1* | 1/2009 | Yamada | H04B 1/7143 370/329 |
| 2009/0040991 | A1 | 2/2009 | Igarashi et al. | |
| 2010/0220645 | A1* | 9/2010 | Kwon | H04B 7/2606 370/315 |
| 2010/0246518 | A1* | 9/2010 | Gheorghiu | H04L 1/0028 370/329 |
| 2011/0044391 | A1* | 2/2011 | Ji | H04L 5/0007 375/260 |
| 2011/0075624 | A1* | 3/2011 | Papasakellariou | H04L 5/0053 370/329 |
| 2011/0085457 | A1* | 4/2011 | Chen | H04L 1/1812 370/252 |
| 2011/0170496 | A1* | 7/2011 | Fong | H04L 5/0053 370/329 |
| 2011/0205995 | A1* | 8/2011 | Grovlen | H04L 5/0007 370/329 |
| 2011/0249633 | A1* | 10/2011 | Hong | H04L 5/0053 370/329 |
| 2011/0269442 | A1* | 11/2011 | Han | H04W 72/082 455/418 |
| 2012/0054258 | A1* | 3/2012 | Li | H04W 72/0406 709/201 |
| 2012/0093085 | A1 | 4/2012 | Kwon et al. | |
| 2012/0106465 | A1* | 5/2012 | Haghighat | H04W 72/1289 370/329 |
| 2012/0176884 | A1* | 7/2012 | Zhang | H04B 7/024 370/203 |
| 2012/0207103 | A1* | 8/2012 | Dai | H04W 48/08 370/329 |
| 2012/0281667 | A1* | 11/2012 | Chang | H04L 5/001 370/329 |
| 2013/0022008 | A1* | 1/2013 | Berggren | H04L 5/001 370/329 |
| 2013/0028191 | A1* | 1/2013 | Qi | G10L 19/24 370/328 |
| 2013/0039284 | A1* | 2/2013 | Marinier | H04L 5/001 370/329 |
| 2013/0083719 | A1* | 4/2013 | Seo | H04L 5/0057 370/312 |
| 2013/0329686 | A1* | 12/2013 | Kim | H04W 72/04 370/329 |
| 2014/0036821 | A1* | 2/2014 | Mcnamara | H04L 5/0039 370/329 |
| 2014/0119275 | A1* | 5/2014 | Kim | H04L 5/0023 370/315 |
| 2014/0126531 | A1* | 5/2014 | Kang | H04L 5/0053 370/330 |
| 2014/0211730 | A1* | 7/2014 | Seo | H04L 5/0053 370/329 |
| 2015/0092728 | A1* | 4/2015 | Wang | H04L 5/0048 370/329 |

FOREIGN PATENT DOCUMENTS

| | | |
|---|---|---|
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2508593 A | 6/2014 |
| GB | 2508595 A | 6/2014 |
| GB | 2510140 A | 7/2014 |
| GB | 2510367 A | 8/2014 |
| GB | 2513311 A | 10/2014 |
| GB | 2513312 A | 10/2014 |
| JP | 2012-10202 A | 1/2012 |
| JP | 2012-80416 A | 4/2012 |
| WO | WO 2012/104633 A1 | 8/2012 |
| WO | WO 2012/104634 A1 | 8/2012 |
| WO | WO 2012104633 A1 * | 8/2012 ........... H04L 5/0039 |

OTHER PUBLICATIONS

U.S. Appl. No. 14/429,210, filed Mar. 18, 2015, Webb, et al.
U.S. Appl. No. 14/442,149, filed May 12, 2015, Webb, et al.
International Search Report dated Feb. 6, 2014 in PCT/GB2013/053189 (submitting English translation only).
"Recommendation for bandwidth reduction" Huawei, HiSilicon, CMCC, 3GPP Draft, R1-121708, 3$^{rd}$ Generation Partnership Project, Mobile Competence Centre, 650, Route des Lucioles, F-06921 Sophia-Antipolis Cedex , France, vol. RAN WG1, No. Jeju, Korea, XP050600066, Mar. 26-30, 2012, 6 Pages.
"Review of approaches for bandwidth reduction for low complexity MTC LTE UEs" IP Wireless Inc. 3GPP Draft, R1-114267, 3$^{rd}$ Generation Partnership Project, Mobile Competence Centre, 650, Route des Lucioles, F-06921 Sophia-Antipolis Cedex , France, vol. RAN WG1, No. San Francisco, USA, XP050562333, Nov. 14-18, 2011, 5 Pages.
"Coverage Extension for MTC UEs" General Dynamics Broadband UK, 3GPP Draft, R1-125204, 3$^{rd}$ Generation Partnership Project, Mobile Competence Centre, 650, Route des Lucioles, F-06921 Sophia-Antipolis Cedex , France, vol. Ran WG1, No. New Orleans, Louisiana, XP050663062, Nov. 12-16, 2012, 7 Pages.
"Resource Allocation and Downlink Control Channel Structure for Relay Backhaul Link" LG Electronics, 3GPP Draft, R1-091194, 3$^{rd}$ Generation Partnership Project, Mobile Competence Centre, 650,

(56) References Cited

OTHER PUBLICATIONS

Route des Lucioles, F-06921 Sophia-Antipolis Cedex, France, vol. RAN WG1, No. Seoul. Korea, XP050338811, Mar. 23-27, 2009, 7 Pages.
Office Action dated May 2, 2017 in Chinese Patent Application No. 201380063300.8.
Japanese Office Action dated Aug. 15, 2017in Patent Application No. 2015-546090 (with English Translation).
Huawei, HiSilicon, "Text Proposal for TR 36.888 on Coverage Improvement", 3GPP TSG-RAN WG1 #71, R1-124704, Nov. 12-16, 2012, 4 pages (with cover page).
Huawei, HiSilicon, "Further Considerations on Reduction of Maximum Bandwidth for Low Cost MTC", 3GPP TSG-RAN WG1 #71, R1-125163, Nov. 12-16, 2012, 5 pages (with cover page).

* cited by examiner

VC-PDCCH (Front)

VC-PDCCH (Back)

TRANSMISSION OF CONTROL INFORMATION TO REDUCED BANDWIDTH TERMINALS

CROSS-REFERENCE TO RELATED APPLICATIONS

The present application claims priority to British Patent Application 1221717.0, filed in the UK IPO on Dec. 3, 2012, British Patent Application 1221729.5, filed in the UK IPO on Dec. 3, 2012, European Patent Application 13171561.7, filed in the European Patent Office on Jun. 11, 2013 and European Patent Application 13171558.3, filed in the European Patent Office on Jun. 11, 2013, the entire contents of each of which being incorporated herein by reference.

TECHNICAL FIELD OF THE DISCLOSURE

The present disclosure relates to wireless communications networks, infrastructure equipment for wireless communications networks and methods of communicating with wireless communications networks.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on.

Whilst it can be convenient for a terminal such as an MTC type terminal to take advantage of the wide coverage area provided by a third or fourth generation mobile telecommunication network there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. As such, certain classes of telecommunications device, such as MTC devices, support "low capability" communication applications that are characterised, for instance, by the transmission of small amounts of data at relatively infrequent intervals. MTC devices are constructed so that individually they represent little burden on telecommunications networks and thus can be deployed in greater numbers than equivalent "full capability" terminals in the same networks.

In many scenarios, it is preferable to provide terminals dedicated to such "low capability" communication applications with a simple receiver unit (or transceiver unit) having capabilities more commensurate with the amount of data likely to be transmitted to (or from) the terminal.

To support MTC terminals, it has been proposed to introduce a "virtual carrier" operating within a bandwidth of one or more "host carriers": the proposed virtual carrier concept preferably integrates within the communications resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier. Accordingly, data transmitted on the virtual carrier can be received and decoded using a reduced complexity receiver unit: with concomitant benefits such as increased simplicity, increased reliability, reduced form-factor and lower manufacturing cost. The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

Virtual carrier (VC) capable MTCs are presumed to receive only certain symbols across all host carrier (HC) sub-carriers (the HC control region)—the remaining symbols are typically received across one of a plurality of VC bandwidth ranges. In conventional LTE, this HC control region includes resource elements (RE) for all UEs, called common search spaces (CSS), the CSSs being provided at predetermined locations, and other resource elements (RE) for uniquely specified UEs, called UE search spaces (UESS). The VC provides dedicated VC control regions amongst the symbols received across the VC bandwidth range.

An efficient operation of a wireless telecommunications system for MTC devices is therefore desirable.

SUMMARY OF THE DISCLOSURE

According to an example embodiment of the present disclosure there is provided a method of communicating data to mobile terminals from an OFDM wireless communications network which provides a wireless access interface for communicating the data using a plurality of OFDM sub-carriers. The method comprises providing a first control channel having a bandwidth corresponding to a first frequency band at first temporal position within a sub-frame, and allocating communications resources of a first group of OFDM sub-carriers to communications terminals of a first type and allocating communications resources of a second group of OFDM sub-carriers to a second group of communications terminals of a second type. The second group of the plurality of OFDM sub-carriers is smaller than the first group of the plurality of OFDM sub-carriers and the second frequency band is selected from within the first frequency band to form a virtual carrier. The resource allocation messages also allocate resources to the terminals of the second type over the second bandwidth corresponding to the second group of OFDM sub-carriers, and the method includes providing a second control channel within the second frequency band using one or more of the second group of OFDM sub-carriers in a second temporal position within the time divided sub-frame, and transmitting control information which is specific to transmitting the data by the terminals of the second type via the second group of OFDM sub-carriers.

According to the example embodiments, the communications terminals of the second type thereby receive resource allocation messages from the first control channel to allocate resources within the second frequency band forming the virtual carrier and receive control information, which is specific to the communications terminals of the second type which are receiving data from the second frequency band of the virtual carrier via a second control channel. Accordingly, there is provided a logical separation of full capability type terminals and communications terminals of a reduced capability of the second type in respect of the transmission of control information, but uses the same resource allocation messages for both the full-capability terminals and the reduced capability terminals of the second type thereby improving compatibility with conventional operation of LTE networks.

In some examples the communications terminals of the second type may have a capability to receive messages transmitted via the first control channel across the frequency band of the first group of OFDM sub-carriers because these second type of devices are capable of receiving radio frequency signals from the first frequency band, but may be configured to operate at a reduced base band rate. Accordingly, embodiments of the present technique can provide an arrangement in which the resource allocation messages for all communications terminals operating with the wireless communications network are transmitted via the first control channel. Such an arrangement thereby provides a more consistent treatment of communications terminals of the different types making a slower evolution of, for example, an LTE network to introduce a virtual carrier.

In contrast to the proposal made in our co-pending UK patent application GB1101972.6 in which the virtual carrier is provided within a host carrier so that reduced capability terminals operate in a substantially autonomous way with respect to the full capability communications terminals, embodiments of the present technique seek to provide a wireless communications network which operates as a conventional network and only provides a reduced level of system adaptation to implement a virtual carrier.

Various further aspects and embodiments of the disclosure are provided in the appended claims, which include a communications terminal and a method of communicating.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Conventional Network

Figure 1:
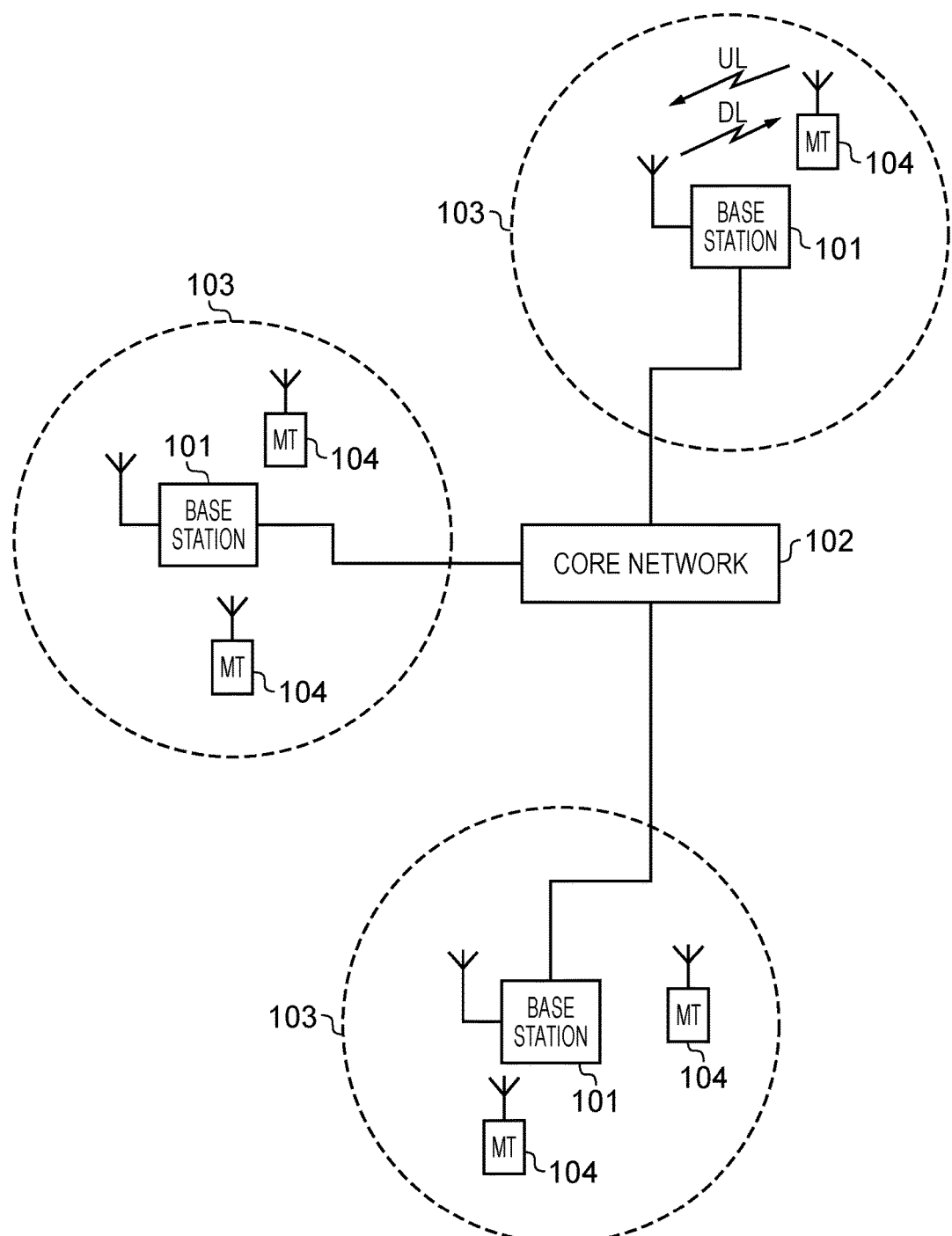
FIG. 1 provides a schematic diagram illustrating an example of a conventional mobile telecommunication network.

FIG. 1 provides a schematic diagram illustrating the basic functionality of a conventional mobile telecommunications network.

The network includes a plurality of base stations 101 connected to a core network 102. Each base station provides a coverage area 103 (i.e. a cell) within which data can be communicated to and from mobile terminals 104. Data is transmitted from a base station 101 to a mobile terminal 104 within a coverage area 103 via a radio downlink. Data is transmitted from a mobile terminal 104 to a base station 101 via a radio uplink. The core network 102 routes data to and from the mobile terminals 104 and provides functions such as authentication, mobility management, charging and so on.

The term communications devices will be used to refer to a communications terminal or apparatus which can transmit or receive data via the mobile communications network. Other terms may also be used for communications devices such as personal computing apparatus, remote terminal, transceiver device or user equipment (UE) which may or may not be mobile.

Figure 2:
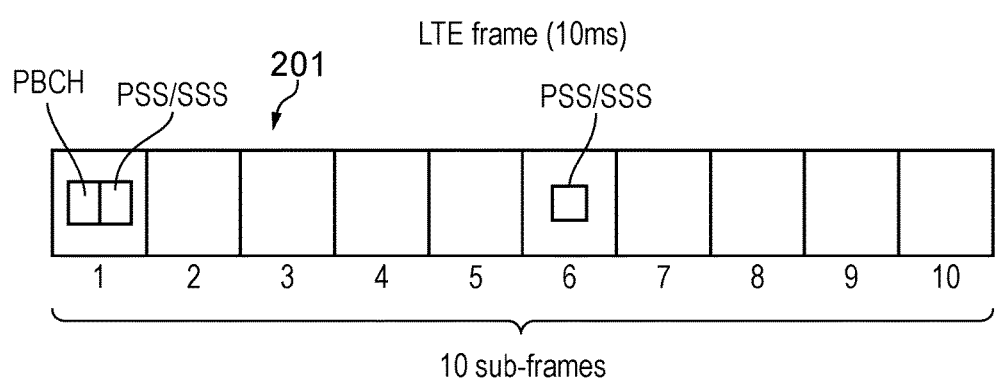
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
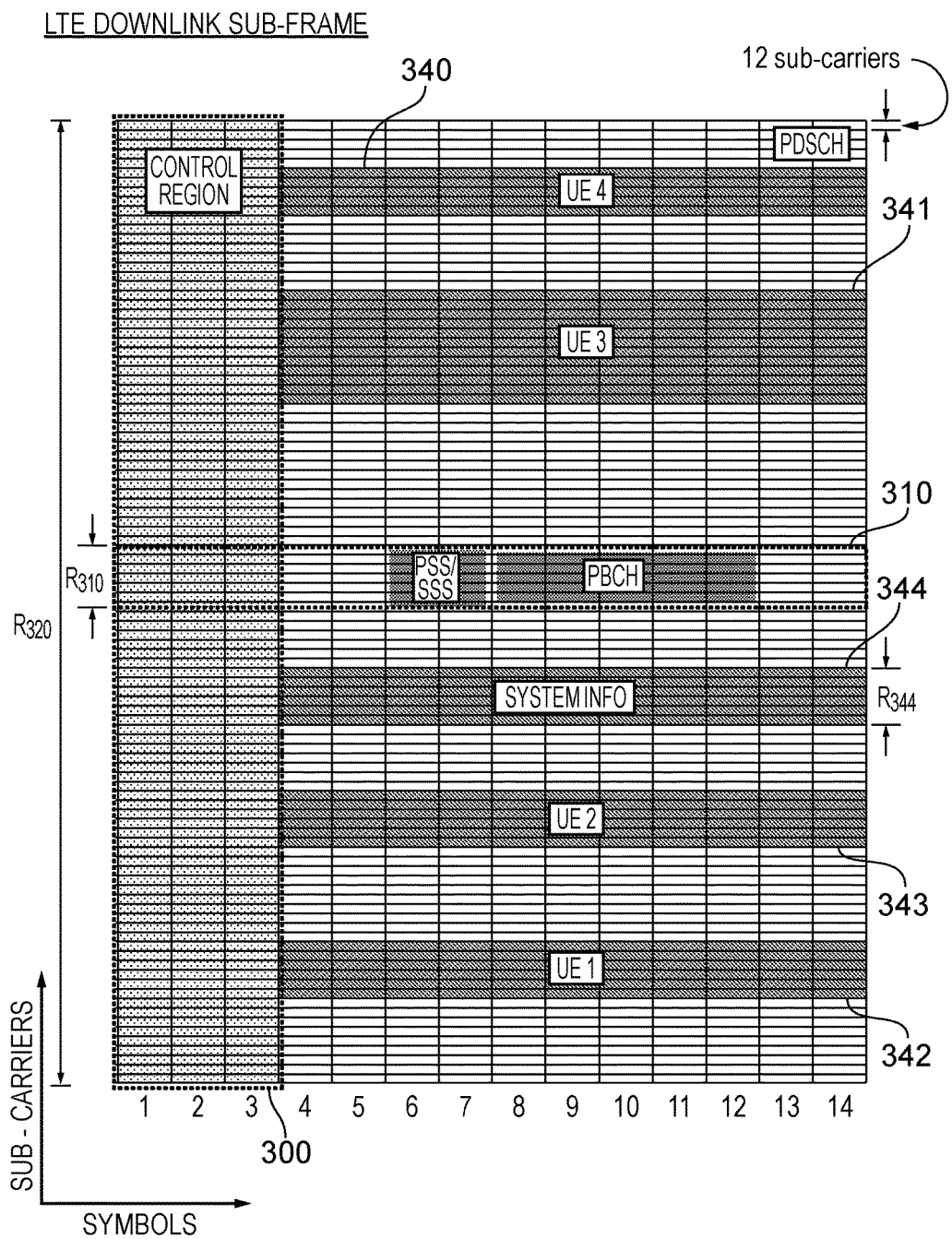
FIG. 3 provides a schematic diagram illustrating an example of a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, instead each individual box in the sub-frame grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers, the resource allocation 343 for a second LTE terminal (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. For clarity, the following description relates to host carriers with channel bandwidth of 3 MHz or greater where the maximum value of n will be 3. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the first block of resources 342, that UE2 has been allocated the second block of resources 343, and so on. The PCFICH contains control data indicating the size of the control region (i.e. between one and three symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE terminal 104 to achieve frame synchronisation and determine the cell identity of the enhanced Node B transmitting the downlink signal. The PBCH carries information about the cell, comprising a master information block (MIB) that includes parameters that the LTE terminals require to access the cell. Data transmitted to individual LTE terminals on the physical downlink shared channel (PDSCH) can be transmitted in the remaining blocks of resource elements of the sub-frame. Further explanation of these channels is provided in the following sections.

FIG. 3 also shows a region of PDSCH containing system information transmitted on a broadcast channel and extending over a bandwidth of $R_{344}$.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, data transmitted on the PDCCH, PCFICH and PHICH is typically distributed on the sub-carriers across the entire bandwidth of the sub-frame. Therefore a conventional LTE terminal must be able to receive the entire bandwidth of the sub-frame in order to receive and decode the control region.

Conventional Camp on Procedure

Figure 4:
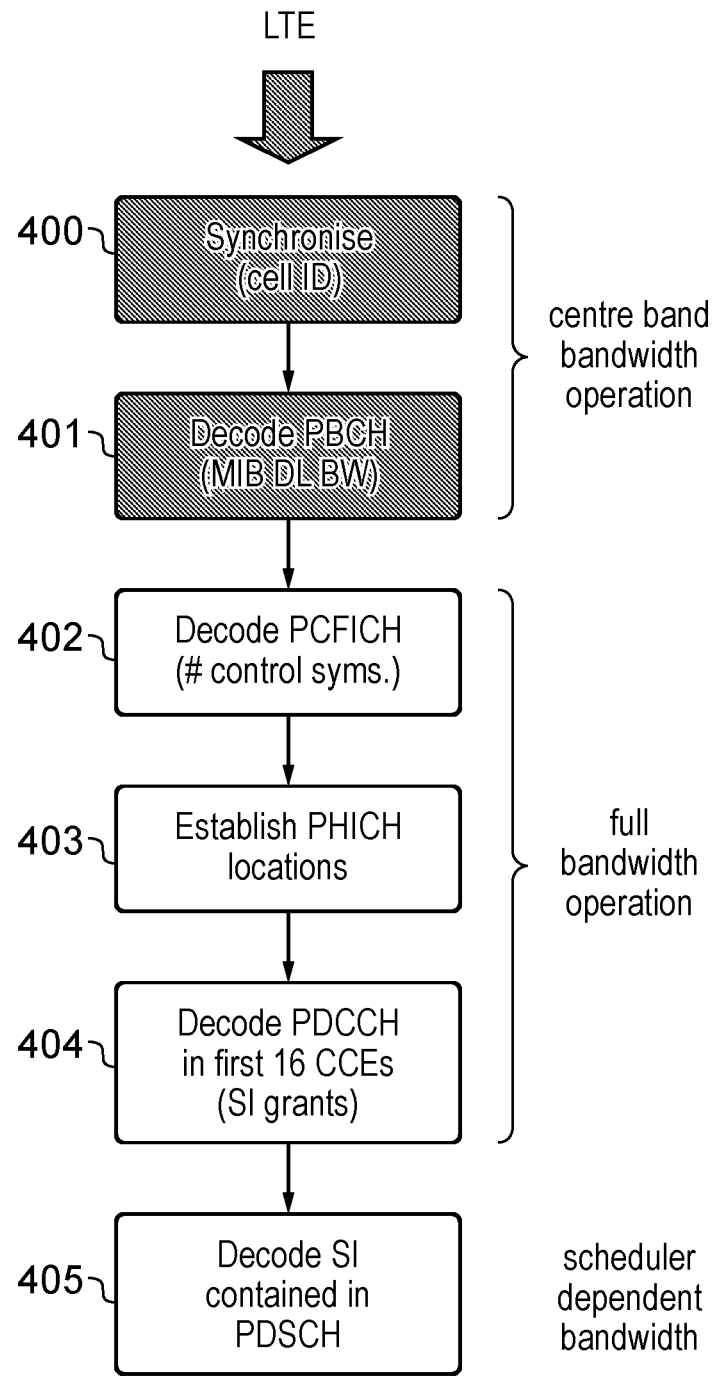
FIG. 4 provides a schematic diagram illustrating a conventional LTE "camp-on" procedure.

FIG. 4 illustrates an LTE "camp-on" process, that is the process followed by a terminal so that it can decode downlink transmissions which are sent by a base station via a downlink channel on a carrier band. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band 310 of the carrier as mentioned above. As can be seen with reference to FIG. 3 the centre band 310 has a bandwidth range R310, where the band is at the centre of the carrier (i.e. occupying the central sub-carriers).

The terminal detects this centre band and detects the PSS and SSS which indicate the cyclic prefix duration and the Cell ID. In LTE the PSS and SSS are only transmitted in the first and sixth sub-frames of each radio frame. Of course, in a different system, for example a non-LTE system, the band 310 may not be at the centre of the carrier band and may be wider or narrower than 72 sub-carriers or 1.08 MHz. Likewise, the sub-frames may be of a different size or sizes.

The terminal then decodes the PBCH (step 401), also carried on the centre band 310, where the PBCH includes in particular the Master Information Block (MIB). The MIB indicates in particular the bandwidth $R_{320}$ of the downlink carrier, the System Frame Number (SFN), and the PHICH configuration. Using the MIB carried on the PBCH, the terminal can then be made aware of the bandwidth $R_{320}$ of the carrier. Because the terminal also knows where the central band 310 is, it knows the exact range $R_{320}$ of the downlink carrier.

For each sub-frame, the terminal then decodes the PCFICH which is distributed across the entire width of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At that stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require the terminal to operate on the entire bandwidth $R_{320}$ of the carrier band.

At steps 402 to 404, the terminal decodes information contained in the control region 300 of a sub-frame. As explained above, in LTE, the three control channels mentioned above (PCFICH, PHICH and PDCCH) can be found across the control region 300 of the carrier where the control regions extends over the range $R_{320}$ and occupies the first one, two or three OFDM symbols of each sub-frame as discussed above. In a sub-frame, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE sub-frame the PDSCH generally occupies groups of resource elements which are neither in the control region nor in the resource elements occupied by PSS, SSS or PBCH. The data in the blocks of resource elements 340, 341, 342, 343 shown in FIG. 3 have a smaller bandwidth than the bandwidth of the entire carrier although to decode these blocks, a terminal first receives the PDCCH across the frequency range $R_{320}$ and if the PDCCH indicates that a PDSCH resource should be decoded, once it has received the entire sub-frame, it then decodes only the PDSCH in only the relevant frequency range indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present disclosure a "virtual carrier" is inserted in a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
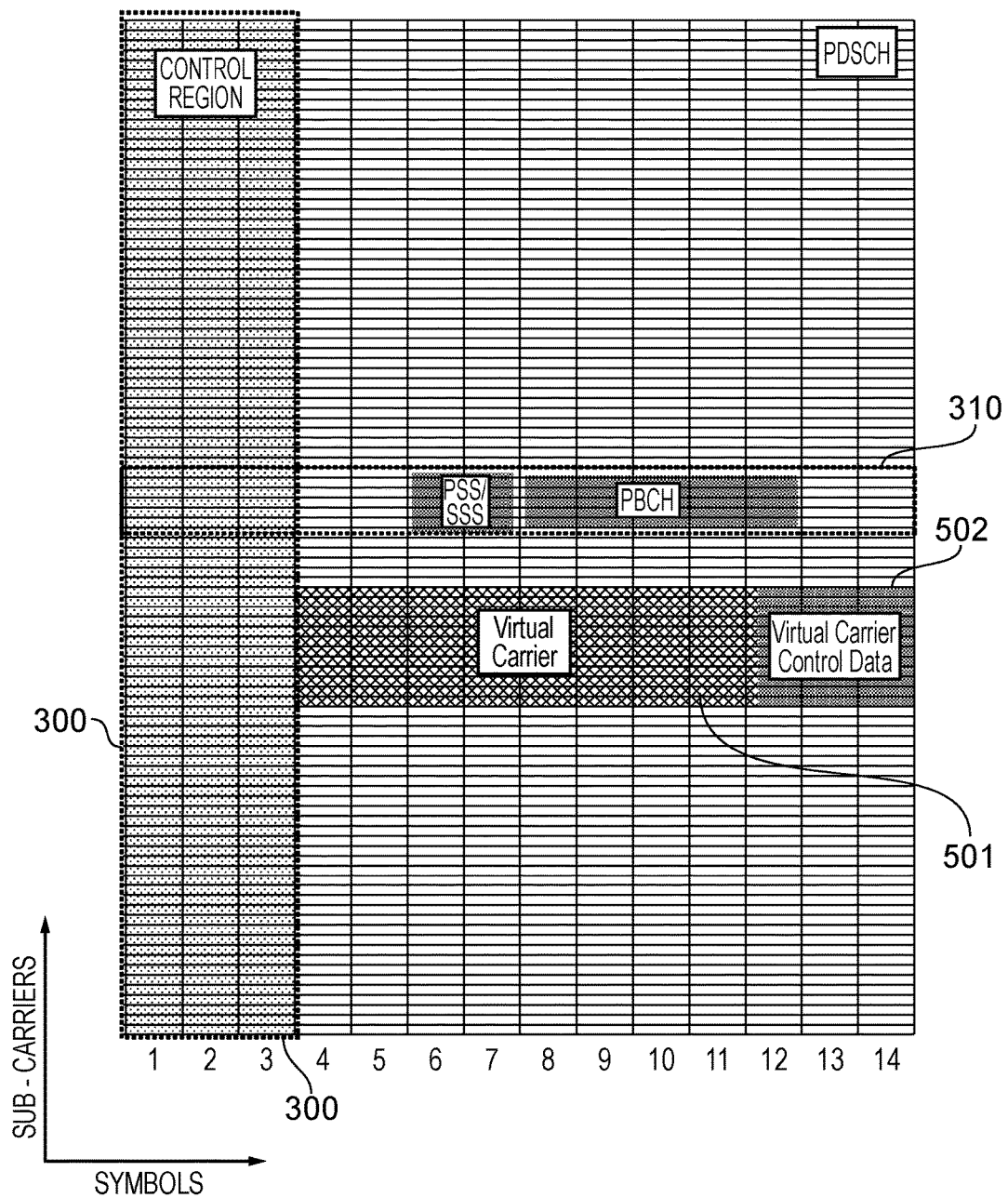
FIG. 5 provides a schematic diagram illustrating an LTE downlink radio sub-frame in which a virtual carrier has been inserted in accordance with an embodiment of the disclosure.

FIG. 5 provides a schematic diagram illustrating an LTE downlink sub-frame which includes a virtual carrier inserted in a host carrier in accordance with an example of the present disclosure.

In keeping with a conventional LTE downlink sub-frame, the first n symbols (n is three in FIG. 5) form the control region 300 which is reserved for the transmission of downlink control data such as data transmitted on the PDCCH. However, as can be seen from FIG. 5, outside of the control region 300 the LTE downlink sub-frame includes a group of resource elements below the central band 310 which form a virtual carrier 501. As will become clear, the virtual carrier 501 is adapted so that data transmitted on the virtual carrier 501 can be treated as logically distinct from the data transmitted in the remaining parts of the host carrier and can be decoded without first decoding all the control data from the control region 300. Although FIG. 5 shows the virtual carrier occupying frequency resources below the centre band, in general the virtual carrier can alternatively either occupy frequency resources above the centre band or frequency resources including the centre band. If the virtual carrier is configured to overlap any resources used by the PSS, SSS or PBCH of the host carrier, or any other signal transmitted by the host carrier that a mobile terminal operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This could be any suitable bandwidth providing it is smaller than that of the host carrier. In the example shown in FIG. 5 the virtual carrier is transmitted across a bandwidth comprising 12 blocks of 12 sub-carriers (i.e. 144 sub-carriers) which is equivalent to a 2.16 MHz transmission bandwidth. Accordingly, a terminal receiving data transmitted on the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM based mobile communication systems such as LTE, downlink data is dynamically assigned to be transmitted on different sub-carriers on a sub-frame by sub-frame basis. Accordingly, in every sub-frame the network must signal which sub-carriers on which symbols contain data relevant to which terminals (i.e. down-link grant signalling).

Accordingly, as can be seen in FIG. 5, the final symbols of the virtual carrier can be reserved as a virtual carrier control region 502 which is allocated for the transmission of control data. In some examples the number of symbols comprising the virtual carrier control region 502 is fixed for example three symbols. In other examples the virtual carrier control region 502 can vary in size, for example between one and three symbols.

The virtual carrier control region can be located at any suitable position within the virtual carrier for example in the first few symbols of the virtual carrier. In the example of FIG. 5 this could mean positioning the virtual carrier control region on the fourth, fifth and sixth symbols. However, fixing the position of the virtual carrier control region in the final symbols of the sub-frame can provide an advantage because the position of the virtual carrier control region need not vary even if the number of symbols of the host carrier control region varies. This simplifies the processing undertaken by mobile communication terminals receiving data on the virtual carrier because there is no need for them to determine the position of the virtual carrier control region every sub-frame as it is known that it will always be positioned in the final symbols of the sub-frame.

In a further embodiment, the virtual carrier control symbols may reference virtual carrier PDSCH transmissions in a separate sub-frame.

In some examples the virtual carrier may be located within the centre band 310 of the downlink sub-frame. This would minimise the reduction in host carrier PDSCH resources caused by the insertion of a virtual carrier since the resources occupied by the PSS/SSS and PBCH would be contained within the virtual carrier region and not the host carrier PDSCGH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier Resource Allocation

Embodiments of the present technique can provide an arrangement in which a wireless communications network is adapted to include a virtual carrier within a host carrier, which is as far as possible backwardly compatible with existing wireless communications networks, such as those for example which operate in accordance with LTE. Co-pending UK patent application GB1101972.6 discloses an arrangement in which a virtual carrier is provided within a host carrier so that reduced capability terminals operate in a substantially autonomous way with respect to the full band-width LTE communications terminals. As will be explained in the following example embodiments, the present disclosure seeks to provide a wireless communications network, which operates as a conventional network and only provides a reduced level of system adaptation to implement a virtual carrier. Example embodiments will now be described with reference to FIGS. 6 to 10.

Figure 6:
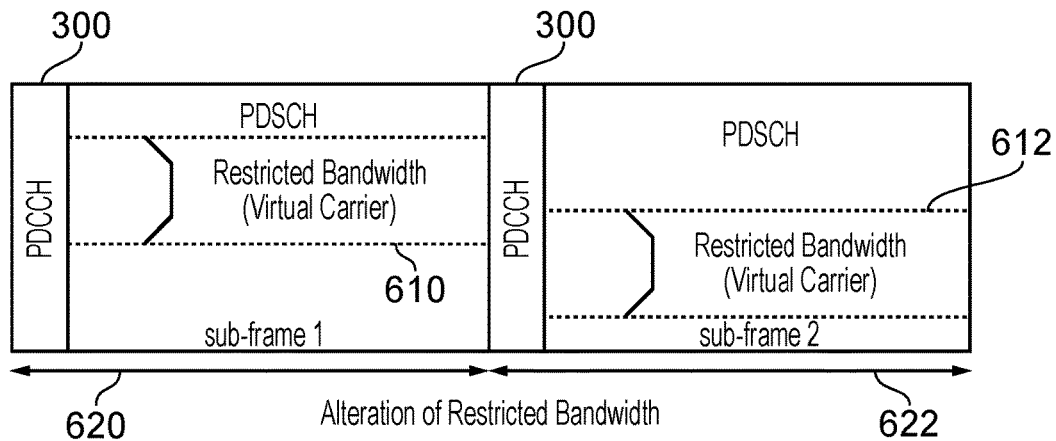
FIG. 6 provides a schematic diagram illustrating a simplified representation of two sub-frames corresponding to the sub frame with a virtual carrier illustrated in FIG. 5.

FIG. 6 provides an example arrangement corresponding to the example LTE sub-frame shown in FIG. 5 with two sub-frames shown with a virtual carrier 610, 612. As can be seen in FIG. 6, the location of the virtual carrier moves from a first sub-frame 620 to be located in a different range of frequencies 612 in the second sub-frame 622.

In accordance with the present technique, the arrangement of the sub-frames representing a configuration of a wireless access interface provides resource allocation messages, which are transmitted to all communications terminals which are operating with the wireless communications network. That is to say that conventional terminals and reduced capability terminals, which are arranged to receive data from the virtual carrier, receive resource allocation messages indicating the resources of the down-link for receiving data from the PDCCH 300. As such the reduced capability terminals are provided with a receiver, which is capable for receiving control messages from the PDCCH 300, and therefore have at least a wide band radio frequency receiver. However such devices may be low power devices or may have a reduced base band capability. According to an example embodiment the wireless access interface provides a control channel which is within the virtual carrier, which provides virtual carrier specific control information. The virtual carrier specific control information is information, which is relevant to reduced capability terminals operating to receive data from the virtual carrier. Examples of a virtual carrier control channel are shown in FIGS. 7, 8, 9 and 10.

Figure 7:
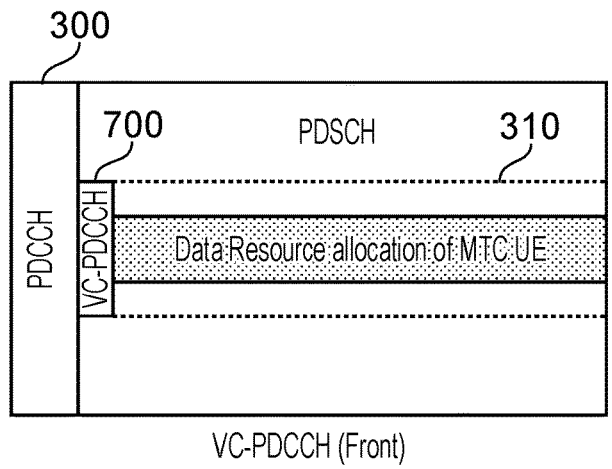
FIG. 7 provides a schematic diagram illustrating an example sub-frame in which a first control channel (PDCCH) is shown with a second control channel within a virtual carrier bandwidth (VC-PDCCH) in which the position of the second control channel is next to the first control channel or at the start of the sub-frame.
Figure 8:
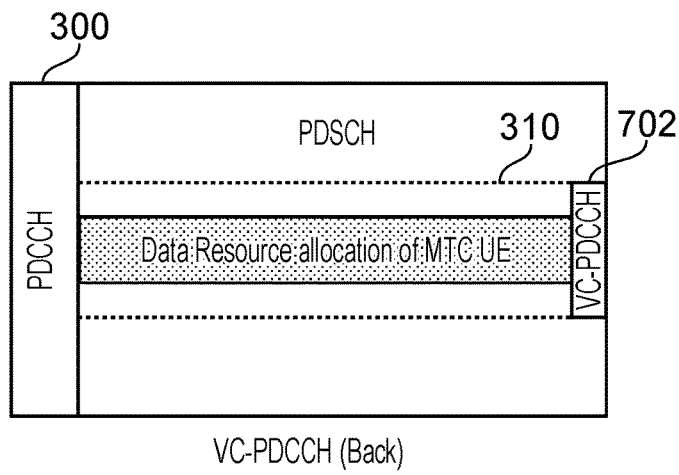
FIG. 8 provides a schematic diagram illustrating an example sub-frame in which a first control channel (PDCCH) is shown with a second control channel within a virtual carrier bandwidth (VC-PDCCH) in which the position of the second control channel is at the end of the sub-frame.
Figure 9:
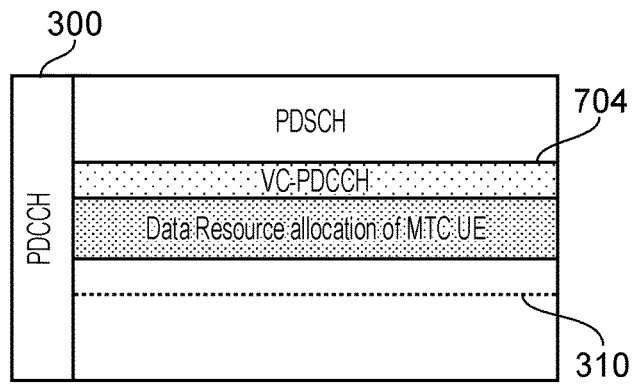
FIG. 9 provides a schematic diagram illustrating an example sub-frame in which a first control channel (PDCCH) is shown with a second control channel within a virtual carrier bandwidth (VC-ePDCCH) in which the second control channel extends in time over the sub-frame but has a narrow bandwidth.
Figure 10:
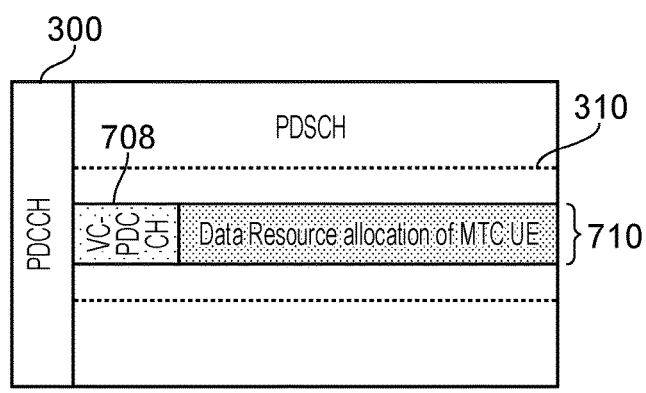
FIG. 10 provides a schematic diagram illustrating an example sub-frame in which a first control channel (PDCCH) is shown with a second control channel within a virtual carrier bandwidth (VC-CCH), which provides information which is specific to a communications terminal.

In FIGS. 7 and 8 the virtual carrier is provided with a VC-PDCCH 700, 702 within the virtual carrier 310. The example shown in FIG. 9 provides a VC-PDCCH in the form of an enhanced PDCCH which is a narrow band PDCCH, which has a temporal duration which is longer than the conventional PDCCH and may extend to the length of the sub-frames after the conventional PDCCH 300. The example shown in FIG. 10 provides a VC-control channel 708 which has a bandwidth which corresponds to the same bandwidth of the shared resources of the virtual carrier 710. In this example the VC-control channel is provided for a specific communications terminal so that the resource allocation message received by a terminal from the PDCCH 300 would direct the terminal to the virtual carrier and from other signalling or from a predetermined operation could then detect the VC-control channel 708 to receive a terminal (UE) specific signalling message.

According to the present technique the VC-PDCCH 700, 702, 704, 708 is used to transmit control information, which is specific to the communications terminals receiving data from the virtual carrier. Examples of virtual carrier specific information include an indication of the location, bandwidth and centre frequency of the virtual carrier in the subsequent or one or more next sub-frames. As can be seen from FIG. 6, in some examples the location of the virtual carrier may change from one sub-frame to the next. As such by providing an indication of the virtual carrier in advance of a potential resource allocation within that virtual carrier, a reduced capability terminal can re-tune more quickly to the allocated resources.

Examples of VC Specific Control Information

Figure 11:
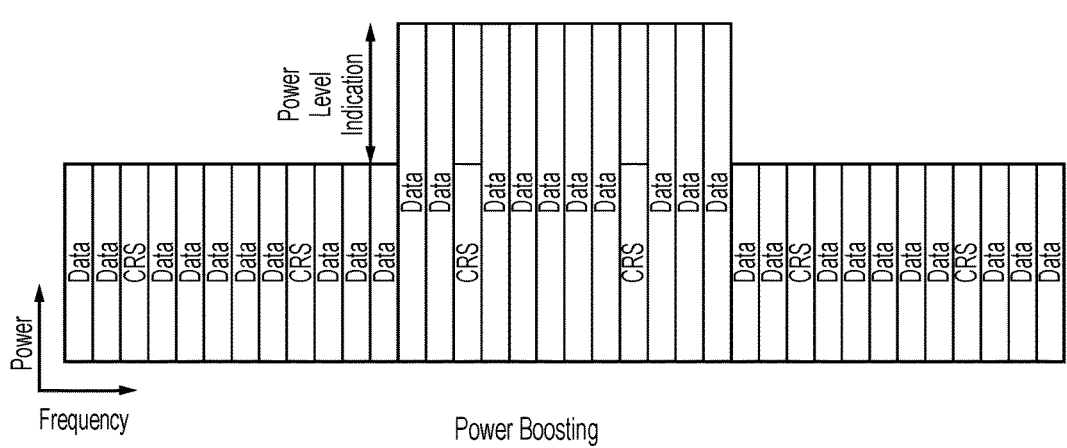
FIG. 11 is a schematic illustration of a representation of power with respect of frequency for OFDM subcarriers which are transmitted within a virtual carrier.

As explained above, example embodiments of the present technique can provide an arrangement for two levels of signalling to communications terminals (UE is) which are configured to communicate via a virtual carrier. According to present technique resource allocation messages are first signalled from the PDCCH 300 in a conventional way to allocate resources on the virtual carrier. However signalling and control information which is associated with the operation of the virtual carrier is signalled to virtual carrier communications devices using a second control channel 700, 702, 704, 708, which is within the bandwidth of the virtual carrier as explained for the above examples with reference to FIGS. 6 to 10. In one example communications terminals which are operating to receive data from the virtual carrier 310 are provided with an indication of an increase in a transmission power level of sub-carriers carrying data transmitted to the communications terminals from sub-carriers within the virtual carrier bandwidth. As explained in our co-pending UK patent application number 1301730.6 in one example application reduced capability communications terminals may be operated with a reduced power or reduced complexity receiver or may be disposed in a location in which it is difficult to receive signals from the wireless communications network. According to this example a power with which data bearing OFDM subcarriers is transmitted is increased in order to improve the likelihood of correctly detecting and recovering data carried by the OFDM sub-carriers. However because reference signals which are transmitted on OFDM sub-carriers within the virtual carrier band must be transmitted with the same power as other reference signals throughout the spectrum of a host carrier for conventional devices to perform channel estimation, subcarriers carrying reference signals must be transmitted with the same power level. This arrangement is shown in FIG. 11, in which the data bearing sub-carriers are labelled "Data" and the reference signal bearing sub-carriers are labelled "CRS" (channel reference symbol). According to the technique disclosed in GB 1301730.6, in order both to estimate a channel through which the received signal has passed and to recover the data from the OFDM sub-carriers with the boosted power level, communications terminals receiving data from the virtual carrier in this way are provided with an indication of a difference between the power with which the reference signals were transmitted compared to the power with which the data subcarriers were transmitted. Therefore providing this information in a virtual carrier control channel as explained above provides a logical separation of virtual carrier specific signalling after resources have been allocated to communications terminals from the conventional PDCCH 300 as for other legacy or full-capability devices.

In another example disclosed in our co-pending UK patent application 1307187.3 reduced capability terminals are arranged to change a state of operation from a powered up state in which the communications terminal provides power to its receiver for receiving data from the wireless communications network, to a sleep or powered down state in which the communications terminal reduces power to its receiver because the communications terminal knows that it will not receive data from the communications network for a predetermined time. According to this disclosure the predetermined time for which the communications terminal can sleep is signalled to the communications terminal separately and is provided on a predetermined basis and performed by the communications terminal as part of a reception process. Therefore again the predetermined time for which the communications terminal can sleep after requesting information and waiting to receive that information can be signalled from the control channel which is specific to the virtual carrier 700, 702, 704, 708, 710.

In another example disclosed in our co-pending UK patent application number 1307186.5, the mobile communications device which may be communicating via a virtual carrier can enter a stasis state as a result of a suspension of a requirement to communicate via the virtual carrier because there is no data to be transmitted or received by the communications terminal. According to this example therefore the communications context of the communications terminal is saved by the mobile network pending reactivation of a communications bearer for conveying data packets to or from the communications terminal. Therefore in one application the virtual carrier control channel can be used to signal to the communications terminal to transition from the stasis state to the active state to reactivate the communications context in order to receive packet data from a reactivated communications bearer.

Other examples include providing the location to communications terminals of an ePDCCH which is within the virtual carrier bandwidth and providing communications terminals with a search space within the ePDCCH. In another example, a location of common system information may be signalled for the example in which more than one virtual carrier is being used within the host carrier bandwidth. As disclosed in 1301295.0 it has been proposed to provide a wireless access interface, which includes a plurality of time divided sub-frames, and at least one of the sub-frames includes a control channel in a part of the sub-frame for communicating first signalling data to reduced capability devices, the first signalling data identifying a location of one or more of the communications resources from which the communications device can receive common system information. The common system information provides information which is common to both a first virtual carrier and a second virtual carrier, and is valid for use by the communications device beyond the sub-frame. For example the common system information may be information which is used by the communications device to configure the transmitter unit or the receiver unit to transmit and/or receive data from the mobile communications network, such has transmission control parameters or signalling for controlling for example hand-over. Alternatively the common system information could be information which is informing a user of an early warning of a possible natural disaster or an emergency notification. The virtual carrier control channel could therefore provide information identifying the location of the common system information.

Operation According to an Example Embodiment

Figure 12:
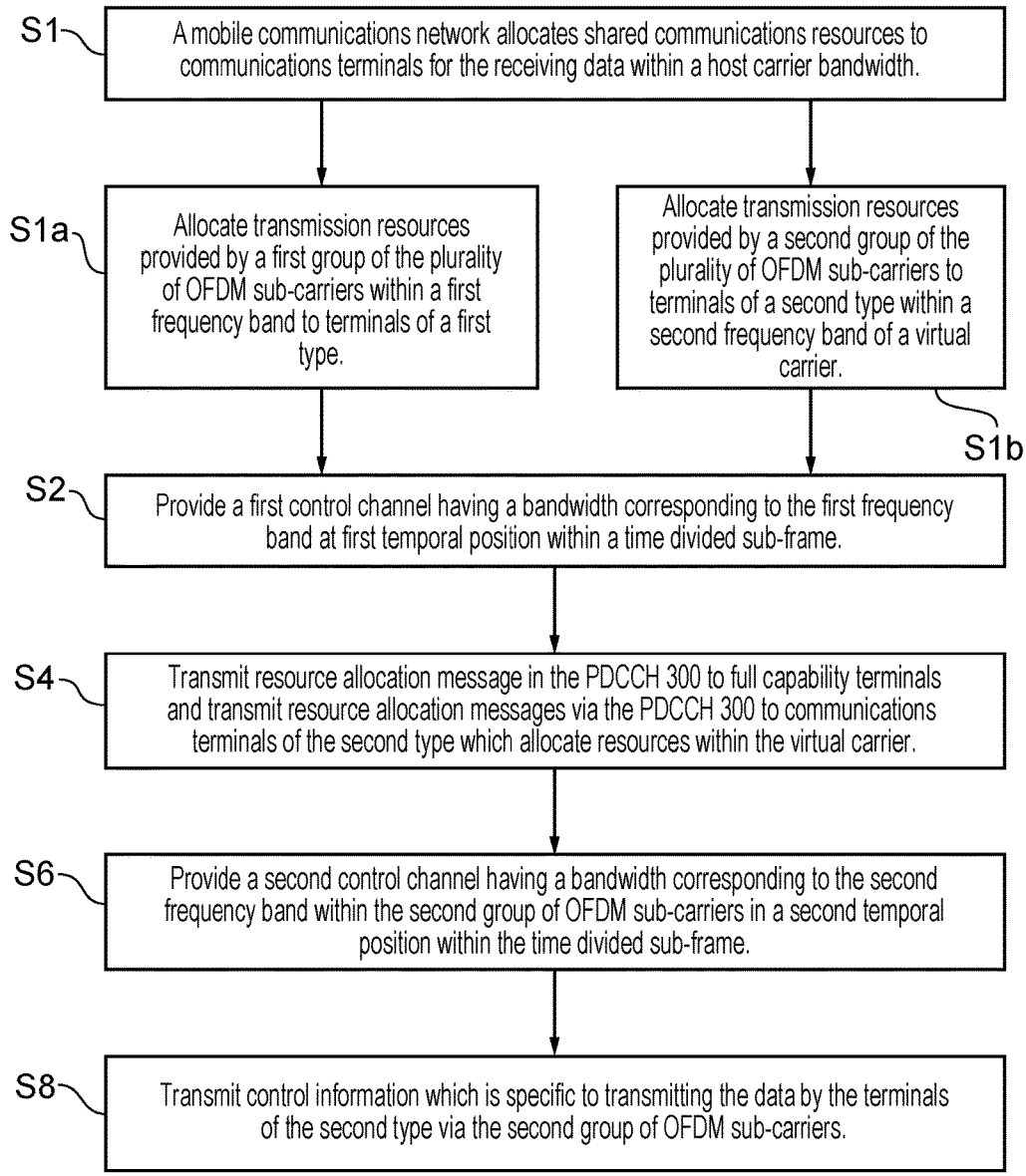
FIG. 12 is an illustrative flow diagram illustrating an example operation of a mobile communications network and communications terminals in accordance with the present technique.

An example operation of a mobile communications network is illustrated by the flow diagram of FIG. 12, which is summarised as follows:

S1: An OFDM wireless communications network provides a wireless access interface for communicating data using a plurality of OFDM sub-carriers. The wireless communications network arranges for the data to be communicated to the communications terminals by allocating the shared communications resources of a host carrier and a virtual carrier to communications terminals of a first type and a second type respectively. In one example the communications terminals of the second type have a reduced capability and are designed to be low power and communicate with a lower communications bandwidth than the first type.

S1a: As for a conventional arrangement the mobile communications network allocates communications resources provided by a first group of the plurality of OFDM sub-carriers within a first frequency band to mobile terminals of a first type.

S1b: In contrast to the proposal made in our co-pending UK patent application number 1101972.6 the mobile communications network also allocates shared communications resources within the virtual carrier formed by the second group of the plurality of OFDM sub-carriers to terminals of a second type within the second frequency band of the virtual carrier. In this respect there is no difference in operation with respect to the allocation of communications sources to conventional terminals except that reduced capability terminals are only allocated resources from within the virtual carrier.

S2: The mobile communications network provides a first control channel having a bandwidth corresponding to the first frequency band at a first temporal position within the sub-frame. This corresponds to the conventional PDCCH 300.

S4: In accordance with a conventional operation, full capability devices are allocated communications resources by transmitting a resource allocation message in the PDCCH 300. Resource allocation messages are also transmitted via the PDCCH 300 to communications terminals of the second type which allocate resources within the virtual carrier.

S6: The mobile communications network also provides a second control channel having a bandwidth corresponding to the second frequency band within the second group of OFDM sub-carriers which is located in a different temporal position within a sub-frame from the first control channel or PDCCH 300.

S8: The mobile communications network transmits and the communications terminals of the second type receive control information which is specific for the operation of the virtual carrier from the second control channel. In one example therefore the communications terminals of the second type may combine the control information received from the first control channel with control information received from the second control channel in order to receive signalling information which is specific to the operation and communication using the virtual carrier.

Two Level Signalling to VC Terminals

Figure 13:
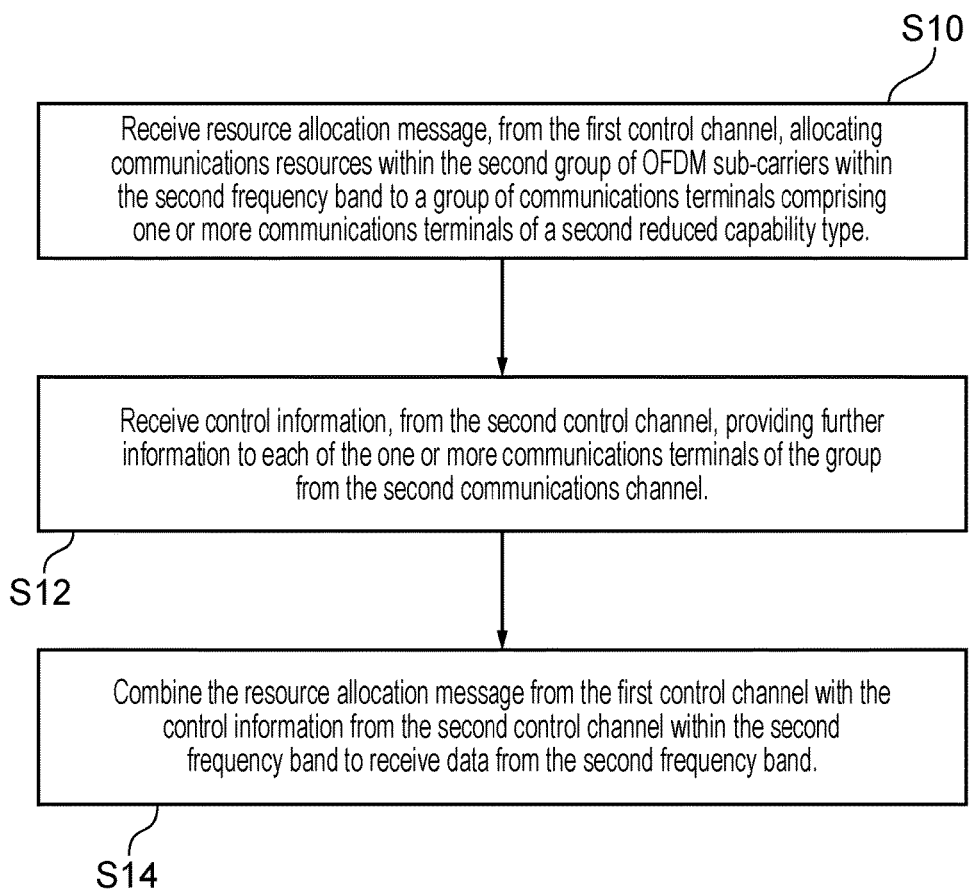
FIG. 13 is an illustrative flow diagram illustrating an example operation of a communications terminal such as an MTC device which is adapted to receive data from a virtual carrier.

As will be understood from the above explanation embodiments the present technique can provide a two level or two tier signalling procedure to reduced capability terminals operating to receive data or transmit data via a virtual carrier. Thus for example a conventional signalling message can be transmitted from the PDCCH 300 and a virtual carrier specific signalling message or a terminal specific signalling message can be transmitted from the second control channel within the virtual carrier. This example arrangement is illustrated by the flow diagram in FIG. 13 which is summarised as follows:

S10: A reduced capability terminal receives a resource allocation message from the first control channel which in one example may be a PDCCH 300. The resource allocation message allocates communications resources within the second group of ODM sub-carriers within the second frequency band. In one example, the resource allocation message provides a resource allocation to a group of communications terminals comprising one or more communications terminals of a second reduced capability type. Thus in accordance with our co-pending UK patent application number 1221717.0 and 1221729.5, the first control channel communicates a signalling message which is identified by a group of communications terminals operating to receive or transmit data via the virtual carrier.

S12: Having received the resource allocation each member of the group of terminals then receives control information from the second channel of the virtual carrier providing further information to each of the one or more communications terminals of the group. The control information may be relevant to the entire group or may directed to one or more members of the group to receive communications resources within the virtual carrier or provide a further command in accordance with the examples given above.

S14: The communications terminal therefore combines the resource allocation message received from the first control channel with control information received from the second control channel within the second frequency band and receives data or performs operations associated with the virtual carrier.

As such it will be appreciated that embodiments of the present technique can provide a two tier signalling arrangement in which resource allocation messages from the first control channel provided for example from the PDCCH 300 is combined with second signalling information received from the second control channel within the virtual carrier, to receive either a resource allocation within the virtual carrier or to perform some other signalling operation associated with the virtual carrier. However, in contract with the arrangement disclosed in our co-pending UK patent application numbers 1221717.0 and 1221729.5 the location of the second control channel within the virtual carrier is not signalled to the communications terminals with the resource allocation message, but is provided by some other signalling message or predefined within the operation of the communications terminals.

Example Architecture

Figure 14:
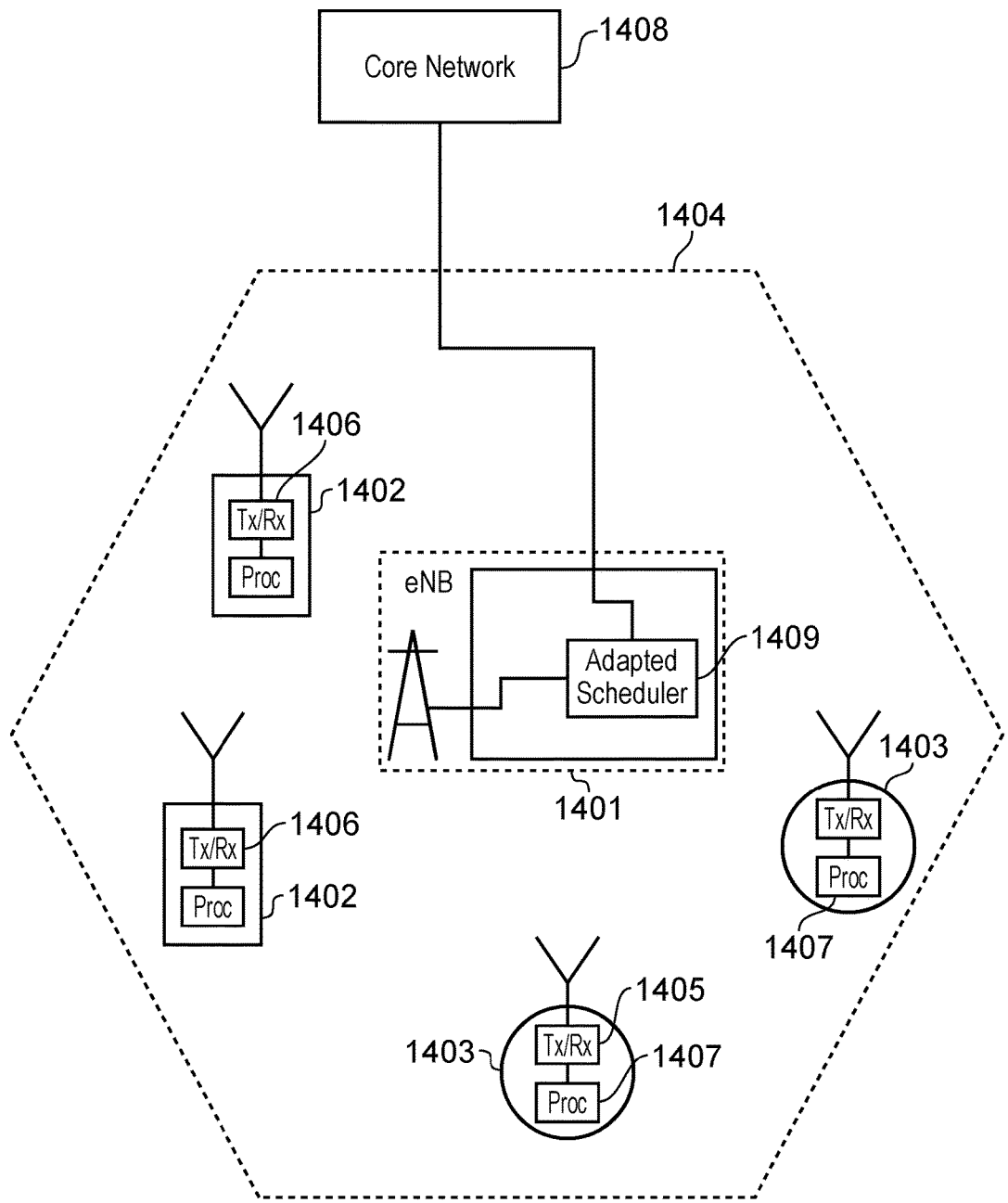
FIG. 14 provides a schematic diagram showing part of an adapted LTE mobile telecommunication network arranged in accordance with an example of the present disclosure.

FIG. 14 provides a schematic diagram showing part of an adapted LTE mobile telecommunication system arranged in accordance with an example of the present disclosure. The system includes an adapted enhanced Node B (eNB) 1401 connected to a core network 1408 which communicates data to a plurality of conventional LTE terminals 1402 and reduced capability terminals 1403 within a coverage area (i.e. cell) 1404. Each of the reduced capability terminals 1403 has a transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE terminals 1402.

The adapted eNB 1401 is arranged to transmit downlink data using a sub-frame structure that includes a virtual carrier as described with reference to FIGS. 6 to 13.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

Various modifications can be made to examples of the present disclosure. Embodiments of the present disclosure have been defined largely in terms of reduced capability terminals transmitting data via a virtual carrier inserted in a conventional LTE based host carrier. However, it will be understood that any suitable device can transmit and receive data using the described virtual carriers for example devices which have the same capability as a conventional LTE type terminal or devices which have enhanced capabilities.

Furthermore, it will be understood that the general principle of inserting a virtual carrier on a subset of uplink or downlink resources can be applied to any suitable mobile telecommunication technology and need not be restricted to systems employing an LTE based radio interface.

The following numbered clauses provide further example aspects and features of the present technique:

1. A communications terminal comprising
a transceiver unit configured to receive data from a wireless communications network transmitted via a wireless access interface provided by the wireless communications network using a plurality of OFDM sub-carriers, and
a controller configured to receive a resource allocation message, which allocates resources to the communications terminal for receiving the data from the wireless communications network, wherein the controller is configured to control the transceiver unit
to receive from a first control channel the resource allocation message, the first control channel having a bandwidth corresponding to a first frequency band, the resource allocation message allocating the communications resources within a second frequency band, the first frequency band providing a first group of the plurality of OFDM sub-carriers within the first frequency band, and the second frequency band being formed from a second group of the plurality of OFDM sub-carriers within a second frequency band, the second group of the plurality of OFDM sub-carriers being smaller than the first group of the plurality of OFDM sub-carriers and the second frequency band being selected from within the first frequency band to form a virtual carrier,
to receive control information from a second control channel within the second frequency band from the second group of OFDM sub-carriers, wherein the control information is specific to receiving the data by the communications terminal from the second group of OFDM sub-carriers.

2. A communications terminal according to clause 1, wherein the control information includes an indication of the location of the second frequency bandwidth providing the second group of OFDM sub-carriers for one or more of the sub-frames.

3. A communications terminal according to clause 1, wherein the resource allocation message is transmitted from the first control channel to allocate resources to the communications terminal, and the control information transmitted via the second control channel provides a second resource allocation message to the communications terminal to allocate resources from the second bandwidth of the second group of OFDM sub-carriers.

4. A communications terminal according to any of clauses 1, 2 or 3, wherein the control information includes an indication that the data is to be transmitted more than once, and the controller is configured in combination with the transceiver unit to receive the data more than once from the second frequency bandwidth using the second group of OFDM sub-carriers.

5. A communications terminal according to any of clauses 1 to 4, wherein the control information includes an indication that the communications terminal can sleep for a predetermined time, and the controller is configured in combination with the transceiver unit to respond to the sleep indication to enter a state of a reduced power consumption.

6. A communications terminal according to any of clauses 1 to 5, wherein the controller is configured in combination with the transceiver unit to receive the resource allocation message from the first control channel, the resource allocation message allocating resources to the communications terminal within the second frequency band of the virtual carrier and to receive the control information from the second control channel, the control information providing a second resource allocation message to allocate resources from the second bandwidth of the second group of OFDM sub-carriers.

7. A communications terminal according to clause 6, wherein the controller is configured in combination with the transceiver unit to receive the resource allocation message from the first control channel, the resource allocation message allocating resources to the communications terminal as a member of a group of the communications terminals and to receive the second resource allocation message from the second channel providing an allocation of the resources of the second group of OFDM sub-carriers within the second frequency bandwidth to the communications terminals as a member of the group of communications terminals.

8. A communications terminal according to any of clauses 1 to 5, wherein the wireless access interface provides a third group of OFDM sub-carriers within a third frequency band, the third group of the plurality of OFDM sub-carriers being smaller than the first group of the plurality of OFDM sub-carriers and the third frequency band being selected from within the first frequency band and mutually exclusive from the second group of OFDM sub-carriers of the second frequency band to form a second virtual carrier, and the controller is configured in combination with the transceiver unit to receive the control information from the second control channel, which includes a second resource allocation message providing an indication of a system information which is common to other communications terminals which are allocated communications resources of the second group of OFDM sub-carriers and the third group of OFDM sub-carriers of the first and second virtual carriers 9. A communications terminal according to any of clauses 1 to 8, wherein the first control channel has a bandwidth which corresponds to the first frequency band of the first group of OFDM sub-carriers and the second control channel within the second frequency band is formed from a plurality of the OFDM sub-carriers of the second group of OFDM sub-carriers and has a duration which exceeds the duration of the first control channel.

10. A communications terminal according to any of clauses 1 to 9, wherein the first control channel having a bandwidth corresponding to the first frequency band is at a first temporal position within a sub-frame, and the second control channel in the second frequency band of the second group of OFDM sub-carriers is in a second temporal position within a sub-frame.

11. A communications terminals according to any of clauses 1 to 10, wherein
the OFDM wireless communications network is arranged in accordance with 3GPP Long Term Evolution (LTE) specifications.

12. A method of receiving data at a communications terminal from a mobile communications network transmitted via a wireless access interface provided by the wireless communications network using a plurality of OFDM sub-carriers, the method comprising
receiving a resource allocation message, which allocates resources to the communications terminal for receiving the data from the wireless communications network, the receiving the resource allocation message including receiving from a first control channel the resource allocation message, the first control channel having a bandwidth corresponding to a first frequency band, the resource allocation message allocating the communications resources within a second frequency band, the first frequency band providing a first group of the plurality of OFDM sub-carriers within the first frequency band, and the second frequency band being formed from a second group of the plurality of OFDM sub-carriers within a second frequency band, the second group of the plurality of OFDM sub-carriers being smaller than the first group of the plurality of OFDM sub-carriers and the second frequency band being selected from within the first frequency band to form a virtual carrier, and the method includes receiving control information from a second control channel within the second frequency band from the second group of OFDM sub-carriers, wherein the control information is specific to receiving the data by the communications terminal from the second group of OFDM sub-carriers.

13. A method according to clause 12, wherein the first control channel having a bandwidth corresponding to the first frequency band is at a first temporal position within a sub-frame, and the second control channel in the second frequency band of the second group of OFDM sub-carriers is in a second temporal position within a sub-frame.

The invention claimed is:

1. A communications terminal comprising:
a transceiver configured to receive data from a wireless communications network transmitted via a wireless access interface provided by the wireless communications network using a plurality of OFDM sub-carriers, and
a controller configured to receive a resource allocation message, which allocates resources to the communications terminal for receiving the data from the wireless communications network, wherein the controller is configured to control the transceiver to
  receive from a physical downlink control channel (PDCCH) the resource allocation message, the PDCCH having a bandwidth corresponding to a first frequency band, the resource allocation message allocating the communications resources within a second frequency band, the first frequency band providing a first group of the plurality of OFDM sub-carriers within the first frequency band, and the second frequency band being formed from a second group of the plurality of OFDM sub-carriers within the second frequency band, the second group of the plurality of OFDM sub-carriers being smaller than the first group of the plurality of OFDM sub-carriers and the second frequency band being selected from within the first frequency band to form a virtual carrier, and
  receive control information from a virtual carrier-physical downlink control channel (VC-PDCCH) within the second frequency band from the second group of OFDM sub-carriers, wherein the control information allocates communication resources for receiving the data by the communications terminal from the second group of OFDM sub-carriers; and
  receive data from within the second frequency band based on a combination of resources allocated for data communication within the second frequency band identified in the resource allocation message received from the PDCCH and resources allocated for data communication within the second group of OFDM sub-carriers identified in the control information received from the VC-PDCCH,
  wherein a location of the VC-PDCCH is not included in the resource allocation message received from the PDCCH and is predefined in the communications terminal,
  wherein the PDCCH and the VC-PDCCH are located at opposite ends of a sub-frame, relative to time, and
  wherein the VC-PDCCH occupies less than one half of the second frequency band.

2. The communications terminal according to claim 1, wherein the control information includes an indication of the location of the second frequency bandwidth providing the second group of OFDM sub-carriers for one or more of the sub-frames.

3. The communications terminal according to claim 1, wherein the resource allocation message is transmitted via the PDCCH to allocate resources to the communications terminal, and the control information transmitted via the VC-PDCCH provides a second resource allocation message to the communications terminal to allocate resources from the second bandwidth of the second group of OFDM sub-carriers.

4. The communications terminal according to claim 1, wherein the control information includes an indication that the data is to be transmitted more than once, and the controller is configured in combination with the transceiver to receive the data more than once from the second frequency bandwidth using the second group of OFDM sub-carriers.

5. The communications terminal according to claim 1, wherein the control information includes an indication that the communications terminal can sleep for a predetermined time, and the controller is configured in combination with the transceiver to respond to the sleep indication to enter a state of a reduced power consumption.

6. The communications terminal according to claim 1, wherein the controller is configured in combination with the transceiver to receive the resource allocation message from the PDCCH, the resource allocation message allocating resources to the communications terminal within the second frequency band of the virtual carrier and to receive the control information from the VC-PDCCH, the control information providing a second resource allocation message to allocate resources from the second bandwidth of the second group of OFDM sub-carriers.

7. The communications terminal according to claim 6, wherein the controller is configured in combination with the transceiver to receive the resource allocation message from the PDCCH, the resource allocation message allocating resources to the communications terminal as a member of a group of the communications terminals and to receive the second resource allocation message from the VC-PDCCH providing an allocation of the resources of the second group of OFDM sub-carriers within the second frequency bandwidth to the communications terminals as a member of the group of communications terminals.

8. The communications terminal according to claim 1, wherein the wireless access interface provides a third group of OFDM sub-carriers within a third frequency band, the third group of the plurality of OFDM sub-carriers being smaller than the first group of the plurality of OFDM sub-carriers and the third frequency band being selected from within the first frequency band and mutually exclusive from the second group of OFDM sub-carriers of the second frequency band to form a second virtual carrier, and the controller is configured in combination with the transceiver to receive the control information from the VC-PDCCH, which includes a second resource allocation message providing an indication of a system information which is common to other communications terminals which are allocated communications resources of the second group of OFDM sub-carriers and the third group of OFDM sub-carriers of the first and second virtual carriers.

9. The communications terminal according to claim 1, wherein the PDCCH has a bandwidth which corresponds to the first frequency band of the first group of OFDM sub-carriers and the VC-PDCCH within the second frequency band is formed from a plurality of the OFDM sub-carriers of the second group of OFDM sub-carriers and has a duration which exceeds the duration of the first control channel.

10. The communications terminal according to claim 1, wherein the PDCCH has a bandwidth corresponding to the first frequency band is at a first temporal position within a sub-frame, and the VC-PDCCH in the second frequency band of the second group of OFDM sub-carriers is in a second temporal position within a sub-frame.

11. The communications terminals according to claim 1, wherein
the wireless communications network is arranged in accordance with 3GPP Long Term Evolution (LTE) specifications.

12. A method of receiving data at a communications terminal from a mobile communications network transmitted via a wireless access interface provided by the wireless communications network using a plurality of OFDM sub-carriers, the method comprising:
receiving a resource allocation message, which allocates resources to the communications terminal for receiving the data from the wireless communications network, the receiving the resource allocation message including
receiving from a physical downlink control channel (PDCCH) the resource allocation message, the PDCCH having a bandwidth corresponding to a first frequency band, the resource allocation message allocating the communications resources within a second frequency band, the first frequency band providing a first group of the plurality of OFDM sub-carriers within the first frequency band, and the second frequency band being formed from a second group of the plurality of OFDM sub-carriers within the second frequency band, the second group of the plurality of OFDM sub-carriers being smaller than the first group of the plurality of OFDM sub-carriers and the second frequency band being selected from within the first frequency band to form a virtual carrier, and the method includes
receiving control information from a virtual carrier-physical downlink control channel (VC-PDCCH) within the second frequency band from the second group of OFDM sub-carriers, wherein the control information allocates communication resources for receiving the data by the communications terminal from the second group of OFDM sub-carriers; and
receiving data from within the second frequency band based on a combination of resources allocated for data communication within the second frequency band identified in the resource allocation message received from the PDCCH and resources allocated for data communication within the second group of OFDM sub-carriers identified in the control information received from the VC-PDCCH,
wherein a location of the VC-PDCCH is not included in the resource allocation message received from the PDCCH and is predefined in the communications terminal,
wherein the PDCCH and the VC-PDCCH are located at opposite ends of a sub-frame, relative to time, and
wherein the VC-PDCCH occupies less than one half of the second frequency band.

13. The method according to claim 12, wherein the control information includes an indication of the location of the second frequency bandwidth providing the second group of OFDM sub-carriers for one or more of the sub-frames.

14. The method according to claim 12, wherein the receiving the resource allocation message includes receiving the resource allocation message from the PDCCH to allocate resources to the communications terminal, and the receiving the control information from the VC-PDCCH includes receiving a second resource allocation message to allocate resources to the communications terminal from the second bandwidth of the second group of OFDM sub-carriers.

15. The method according to claim 12, wherein the PDCCH having a bandwidth corresponding to the first frequency band is at a first temporal position within a sub-frame, and the VC-PDCCH in the second frequency band of the second group of OFDM sub-carriers is in a second temporal position within a sub-frame.

* * * * *